(12) United States Patent
Fu et al.

(10) Patent No.: US 11,088,553 B2
(45) Date of Patent: Aug. 10, 2021

(54) CONTROL SYSTEM

(71) Applicant: CONTEMPORARY AMPEREX TECHNOLOGY CO., LIMITED, Ningde (CN)

(72) Inventors: Yanhui Fu, Ningde (CN); Qidong Lou, Ningde (CN); Xinxin Jiang, Ningde (CN); Qiandeng Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 87 days.

(21) Appl. No.: 16/671,360

(22) Filed: Nov. 1, 2019

(65) Prior Publication Data
US 2020/0251918 A1 Aug. 6, 2020

(30) Foreign Application Priority Data
Jan. 31, 2019 (CN) .......................... 201910100054.8

(51) Int. Cl.
*H02J 7/00* (2006.01)
*B60L 50/60* (2019.01)
*B60L 58/10* (2019.01)

(52) U.S. Cl.
CPC ............ *H02J 7/0029* (2013.01); *B60L 50/60* (2019.02); *B60L 58/10* (2019.02); *B60Y 2200/91* (2013.01); *H02J 2207/20* (2020.01)

(58) Field of Classification Search
CPC ...... H02J 2207/20; H02J 7/0029; H02J 1/082; Y02T 10/70; B60L 58/10; B60L 50/60; B60Y 2200/91
See application file for complete search history.

(56) References Cited

U.S. PATENT DOCUMENTS

| 2003/0067287 | A1 | 4/2003 | Morgen |
| 2017/0361791 | A1 | 12/2017 | Yoon et al. |
| 2019/0109479 | A1* | 4/2019 | Tsujioka ................. B60R 16/03 |

FOREIGN PATENT DOCUMENTS

| CN | 105150874 A | 12/2015 |
| CN | 206727694 U | 12/2017 |

(Continued)

OTHER PUBLICATIONS

Chinese Search Report for Chinese Application No. 201910100054.8 dated Mar. 2, 2020.

(Continued)

*Primary Examiner* — Jared Fureman
*Assistant Examiner* — Duc M Pham
(74) *Attorney, Agent, or Firm* — Heslin Rothenberg Farley & Mesiti P.C.

(57) ABSTRACT

The present disclosure provides a control system, comprising a controller and a plurality of power regulating modules; the plurality of power regulating modules comprise at least one first power regulating module and at least one second power regulating module, the first power regulating module is woken up upon receiving an external wake-up signal, the controller is connected to an output end of one of the first power regulating modules, and an output end of the second power regulating module is connected to a load module; the controller is further connected to a wake-up end of the second power regulating module; the first power regulating module connected to the controller supplies power to the controller; the at least one second power regulating module is woken up upon receiving an internal wake-up signal sent by the powered on controller or upon receiving the external wake-up signal.

13 Claims, 7 Drawing Sheets

(56) References Cited

FOREIGN PATENT DOCUMENTS

| | | | | |
|---|---|---|---|---|
| CN | 108227576 A | * | 6/2018 | ........... G05B 19/042 |
| CN | 207937961 U | | 10/2018 | |
| CN | 208101897 U | | 11/2018 | |
| CN | 109245082 A | | 1/2019 | |
| CN | 109649309 A | | 4/2019 | |
| DE | 112017001674 T5 | | 12/2018 | |
| JP | 2007312543 A | | 11/2007 | |
| JP | 2012240593 A | | 12/2012 | |
| WO | WO-2018214263 A1 | * | 11/2018 | ................ H02J 7/00 |

OTHER PUBLICATIONS

Extended European Search Report for European Patent Application No. 19206940.9 dated Apr. 3, 2020.

International Search Report (and English translation) and Written Opinion of the International Searching Authority for International Application No. PCT/CN2020/072676 dated Apr. 10, 2020.

* cited by examiner

―

CONTROL SYSTEM

CROSS-REFERENCE TO RELATED APPLICATION

This application claims the priority benefit of Chinese Patent Application No. 201910100054.8 filed on Jan. 31, 2019 and entitled "CONTROL SYSTEM", the disclosure of which is incorporated by reference herein in its entirety.

TECHNICAL FIELD

Embodiments of the present disclosure relate to a technical field of circuit technologies, and more particularly, to a control system.

BACKGROUND

With the development of battery technology, it has become a trend in the automotive industry to replace fuel vehicles with electric vehicles. Generally, two batteries are provided in an electric vehicle: a high voltage battery supplying power to a high power device such as a motor and a low voltage battery supplying power to a controller such as a vehicle controller, a battery management system, etc.

SUMMARY

An embodiment of the present disclosure provides a control system, comprising: a controller; and a plurality of power regulating modules; wherein, each of the power regulating modules has an input end for connecting to an external power supply to receive an external voltage, and an output end for outputting a regulated voltage generated according to the external voltage; the plurality of power regulating modules comprising at least one first power regulating module and at least one second power regulating module, the first power regulating module is woken up upon receiving an external wake-up signal, the controller is connected to an output end of one of the first power regulating modules, and an output end of the second power regulating module is connected to a load module; the controller is further connected to a wake-up end of the second power regulating module; the first power regulating module connected to the controller supplies power to the controller upon being woken up, and the controller is powered on; the at least one second power regulating module is woken up upon receiving an internal wake-up signal sent by the powered on controller or upon receiving the external wake-up signal.

Compared with the prior art, the first power regulating module is woken up upon receiving the external wake-up signal, and the first power regulating module outputs a regulated voltage to supply power to the controller, and the controller may wake up at least one second power regulating module after being powered on, the woken up second power regulating module outputs a regulated voltage to supply power to the load module connected thereto; in addition, the second power regulating module may be woken up directly upon receiving the external wake-up signal to supply power to the load module. The present disclosure provides a topology structure of the control system, improves the independence of supplying power to different load modules, and thus may supply power to each load module as needed.

In addition, the control system further comprises a protection circuit connected between the input end of each of the power regulating modules and the external power supply. In the present embodiment, the protection circuit is provided between the external power supply and each of the power regulating modules to prevent the power regulating module from being abnormally damaged by the external power supply.

In addition, the protection circuit comprises one of the following circuits or any of them connected in series: a filter circuit, an anti-reverse circuit, a clamp circuit, and an ESD protection circuit. The present implementation provides a specific structure of the protection circuit.

In addition, the control system further comprises a voltage pre-regulating circuit connected between the input end of each of the power regulating modules and the external power supply; the voltage pre-regulating circuit is configured to pre-regulate the external voltage and output the pre-regulated external voltage to the input end of each of the power regulating modules. In the present embodiment, the external voltage received from the external power supply is pre-regulated by the voltage pre-regulating circuit, so that each of the power regulating modules may regulate the external voltage to a desired regulated voltage more quickly and output it to the controller or the load module.

In addition, the controller is further connected to an output end of the power regulating module and is configured to monitor the regulated voltage, and take a preset measure upon monitoring that the regulated voltage is abnormal. In the present embodiment, the regulated voltage output from each of the power regulating modules is monitored and a preset measure is taken when the regulated voltage is abnormal, thereby preventing components connected to the power regulating module from being damaged and avoiding an accident.

In addition, the power regulating module is further configured to monitor an output current of an output end of the power regulating module, and take an emergency measure upon monitoring that the output current is abnormal. In the present embodiment, the power regulating module may detect and monitor an output current of an output end of its own, and an emergency measure is taken upon monitoring that the output current is abnormal, thereby preventing components connected to the power regulating module from being damaged and avoiding an accident.

In addition, an input end of the second power regulating module is connected to the external power supply through a switching circuit; the switching circuit comprises at least a first switch; a control end of the first switch is connected to the controller; the controller controls the first switch to be switched on and wakes up the second power regulating module, after being powered on. In the present embodiment, the external power supply is connected to each of the second power regulating modules through a switching circuit, and when each of the second power regulating modules is in a sleep state, the external power supply is not conductive with the second power regulating module, thereby reducing the electrostatic current of the whole control system and the power consumption of the external power supply.

In addition, an input end of the first power regulating module is connected to the external power supply through the switching circuit; the first switch connected to the first power regulating module is controlled to be switched on by an external control signal, and the first power regulating module supplies power to the controller upon being woken up. In the present embodiment, the first power regulating module is also connected to the external power supply through the switching circuit, and when the first power regulating module is in a sleep state, the external power supply is not conductive with the first power regulating module, thereby further reducing the electrostatic current of the whole control system and the power consumption of the external power supply.

In addition, the switching circuit further comprises a current limiting element connected in series with the first switch. In the present embodiment, when the first switch is switched off, current in the circuit is limited to a safe range by the current limiting element, thereby avoiding an inrush current being generated instantly when the first switch is switched on.

In addition, the switch circuit further comprises a second switch; the second switch is connected in parallel across a series branch, and a control end of the second switch is connected to the controller; wherein the series branch comprises the first switch and the current limiting element connected in series; wherein, the controller is further configured to control the second switch to be switched on, after being powered on. In the present embodiment, the series branch composed of the first switch and the current limiting element is used as a pre-charging circuit, and the second switch is controlled to be switched on after pre-charging is completed and the controller is powered on, so that the regulated voltage can be directly used to supply power to the controller, and voltage division of the current limiting element is avoided.

In addition, the switch circuit further comprises a voltage detecting unit, a switch driving unit, and a second switch connected in parallel across a series branch; wherein the series branch comprises the first switch and the current limiting element connected in series; the voltage detecting unit is connected in parallel across the current limiting element, and is configured to detect a voltage of the current limiting element; an input end of the switch driving unit is connected to the voltage detecting unit, and an output end thereof is connected to a control end of the second switch; the switch driving unit is configured to receive the voltage of the current limiting element, and controls the second switch to be switched on upon determining that the voltage of the current limiting element satisfies a preset condition. In the present embodiment, the switch driving unit controls the second switch to be switched on upon determining that the voltage of the current limiting element satisfies a preset condition, so that the reaction is faster.

In addition, the first switch and the second switch are both switches with an anti-reverse function. In the present embodiment, with the anti-reverse function of the first switch and the second switch, normal operation of other power regulating modules will not be affected when a fault occurs in a certain power regulating module.

In addition, the control system is a battery management system.

In addition, the controller is further configured to output a wake-up hold signal to each of the power regulating modules after the power regulating module is woken up.

BRIEF DESCRIPTION OF THE DRAWINGS

One or more embodiments are illustrated by pictures in the corresponding drawings. The exemplary descriptions do not constitute a limitation on the embodiments, and elements in the drawings having the same reference numerals are denoted by the same or the like elements, unless otherwise stated, pictures in the figures do not constitute a scale limitation.

DETAILED DESCRIPTION

Embodiments of the present disclosure will be described in details below with reference to the accompanying drawings to make the objects, technical solutions and advantages of the embodiments of the present disclosure more clear. However, those skilled in the art will appreciate that, in various embodiments of the present disclosure, numerous technical details are set forth in order to provide a reader with a better understanding of the present application. However, the technical solutions claimed in the present application can be implemented without these technical details and various changes and modifications made based on the following embodiments.

Generally, in the battery management system, the low voltage battery may output multiple working voltages at the same time to corresponding load components for power supply after supplying power to the controller.

Figure 1:
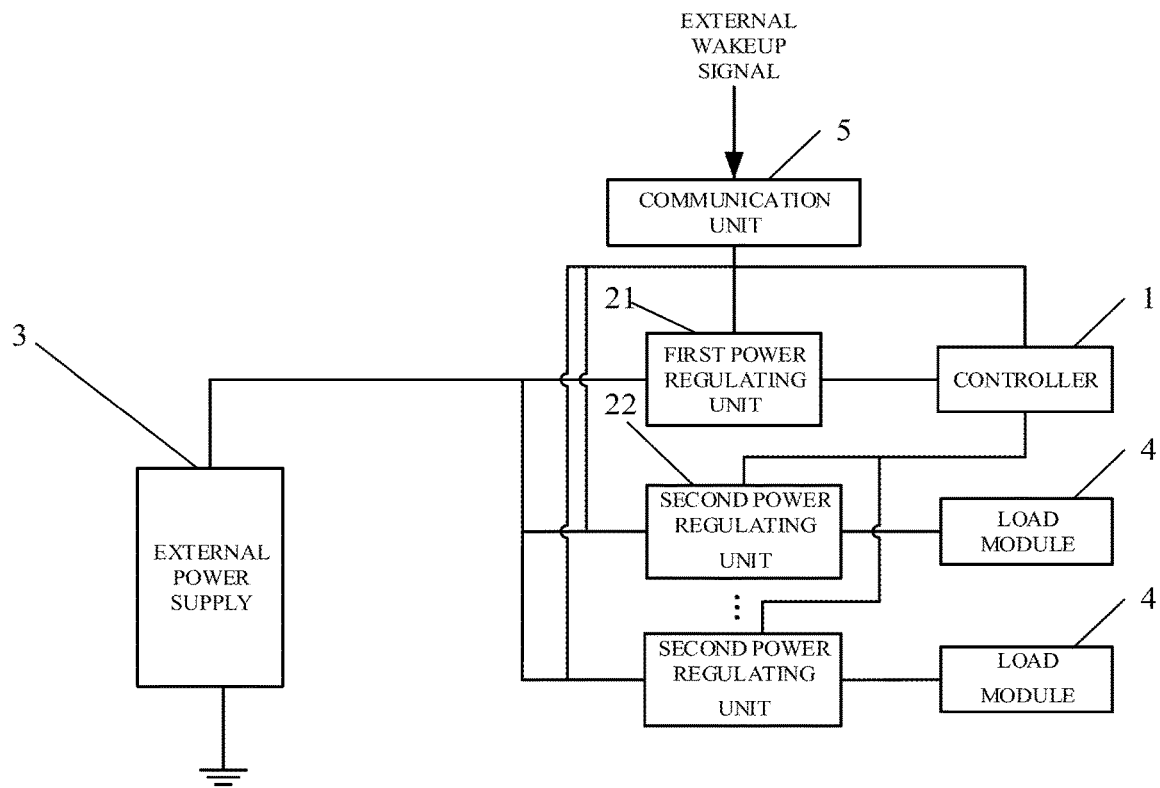
FIG. 1 is a schematic diagram of a control system according to an embodiment of the present disclosure.

The embodiment of the present disclosure relates to a control system, which may be a battery management system for an electric vehicle. Referring to FIG. 1, the control system comprises a controller 1 and a plurality of power regulating modules.

Each of the power regulating modules has an input end for connecting to an external power supply 3 to receive an external voltage, and an output end for outputting a regulated voltage generated according to the external voltage. The external power supply 3 may be a low voltage battery of the electric vehicle, and the power regulating module may be a power chip.

The plurality of power regulating modules comprise at least one first power regulating module 21 and at least one second power regulating module 22, the controller 1 is connected to the output end of one of the first power regulating modules 21, and the output end of the second power regulating module 22 is connected to a load module 4, the controller 1 is further connected to a wake-up end (not shown) of the second power regulating module 22. The regulated voltages output by the first power regulating module 21 and the plurality of second power regulating modules 22 may be set according to components to which they are connected, for example, the first power regulating module 21 outputs a voltage of 5V to the controller 1, the second power regulating modules 22 output a voltage of 1.3V and an isolated power supply voltage of 3.3V, etc., to load modules 4 corresponding thereto.

The first power regulating module 21 is woken up upon receiving an external wake-up signal, the first power regulating module 21 connected to the controller 1 supplies power to the controller 1 upon being woken up, and the controller 1 is powered on; at least one second power regulating module 22 is woken up upon receiving an internal wake-up signal sent by the powered on controller 1 or upon receiving the external wake-up signal, that is, the second power regulating module 22 may be woken up directly upon receiving the external wake-up signal, or be woken up upon receiving the internal wake-up signal sent by the powered on controller 1.

The controller 1 may output a wake-up hold signal to each of the power regulating modules after the power regulating module is woken up, so as to keep each of the woken up power regulating modules to supply power continuously and normally. The controller 1 directly outputting a wake-up hold signal to each of the woken up power regulating modules is only presented in FIG. 1 of the present embodiment, but not presented in the following embodiments for the sake of brevity of the drawings, however, it does not mean that the controller 1 could not output a wake-up hold signal to each of the woken up power regulating modules in these embodiments.

In addition, the first power regulating module 21 and the second power regulating module 22 are also connected to a communication unit 5, so that the external wake-up signal can be received by wireless communication. Specifically, after receiving the external wake-up signal through the communication unit 5, the first power regulating module 21 outputs a regulated voltage to the controller 1 at the output end thereof and the controller 1 is powered on; the powered on controller 1 sends an internal wake-up signal to the second power regulating module 22, and after being woken up, the second power regulating module 22 outputs a regulated voltage to a corresponding load module 4 for supplying power to the load module 4; also, after receiving an external wake-up signal through the communication unit 5, the second power regulating module 22 may output a regulated voltage at the output end thereof to a corresponding load module 4 for supplying power to the load module 4. It should be noted that, the second power regulating module 22 directly receiving an external wake-up signal is only presented in FIG. 1 of the present embodiment, but not presented in the following embodiments for the sake of brevity of the drawings, however, it does not mean that the second power regulating module 22 could not directly receive an external wake-up signal.

It should be noted that, in this embodiment and the following embodiments, an example is taken in which the number of the first power regulating module 21 is one, and the first power regulating modules 21 is connected to the controller 1 and is woken up upon receiving an external wake-up signal to supply power to the controller 1, however, the present disclosure is not limited to this example, there may be a plurality of the first power regulating modules 21, one of them is connected to a controller, and the others are connected to the load modules 4; the plurality of first power regulating modules 21 are woken up upon receiving an external wake-up signal, and the first power regulating module 21 connected to the controller 1 is woken up upon receiving an external wake-up signal for supplying power to the controller 1, and the other first power regulating modules 21 may supply power to the load modules 4 connected thereto after being woken up.

Compared with the prior art, in the present embodiment, the first power regulating module is woken up upon receiving an external wake-up signal, and the first power regulating module outputs the regulated voltage to supply power to the controller, and after being powered on, the controller may wake up at least one second power regulating module, the woken up second power regulating module outputs a regulated voltage to supply power to the load module connected thereto; meanwhile, the second power regulating module may be directly woken up upon receiving an external wake-up signal for supplying power to the load module. The present disclosure provides a topology structure of the control system, which improves the independence of power supply to different load modules, so as to supply power to each of the load modules as needed.

Figure 2:
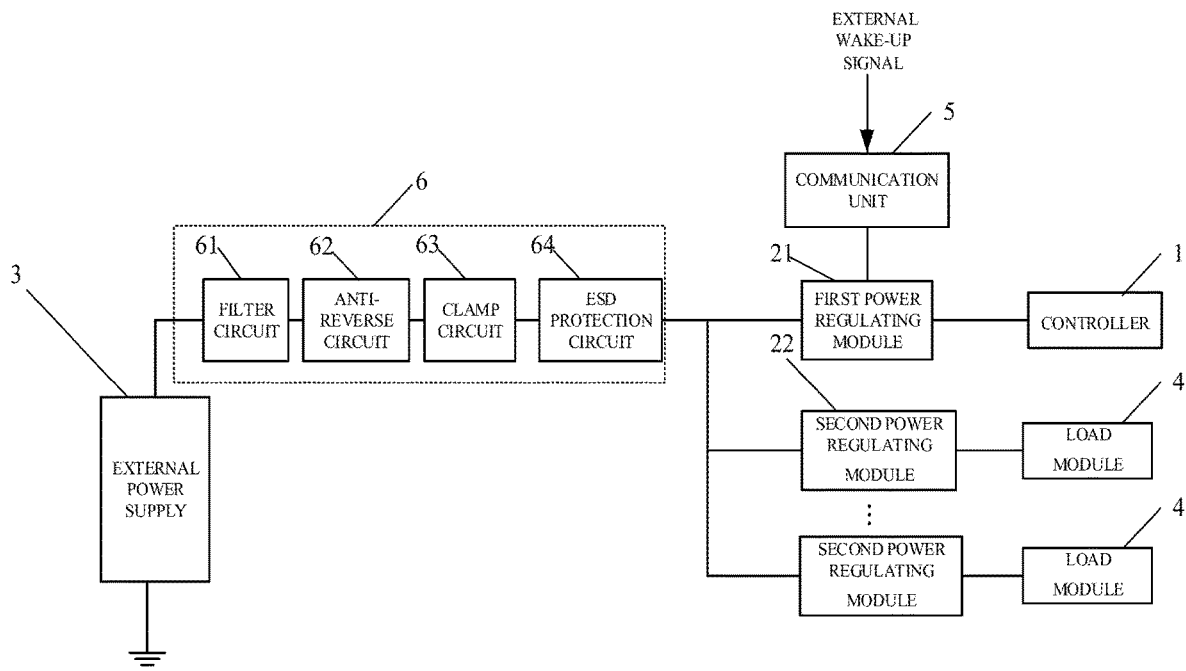
FIG. 2 is a schematic diagram of a control system according to another embodiment of the present disclosure.

Specifically, as compared with the situation in which multiple working voltages are outputting at the same time to corresponding load components for power supply after supplying power to the controller, the present embodiment may independently wake up each of the second power regulating modules by the controller or the external wake-up signal and supply power to the load module connected thereto, thereby improving the independence of power supply to different load modules The present disclosure further provides a control system, which relates to an improvement made based on the embodiment described with reference to FIG. 1, and the main improvement is that, the control system further comprises a protection circuit 6 connected between the input end of each of the power regulating modules and the external power supply 3, as shown in FIG. 2.

The protection circuit 6 comprises one of the following circuits or any number of the circuits connected in series: a filter circuit, an anti-reverse circuit, a clamp circuit, and an ESD protection circuit. In the present embodiment, an example is taken in which the protection circuit 6 comprises a filter circuit 61, an anti-reverse circuit 62, a clamp circuit 63, and an ESD protection circuit 64 connected in series; while, the order of each of the circuits included in the protection circuit 6 is not limited in the present embodiment.

The filter circuit 61 is configured to filter the AC component in the external voltage output by the external power supply 3, and retain the DC component as much as possible. The anti-reverse circuit 62 may be a diode, which may prevent each of the power regulating modules from being damaged when the external power supply 3 is reversely connected. The clamp circuit 63 is configured to clamp the external voltage output from the external power supply to each power regulating module to a preset voltage. The ESD protection circuit 64 may effectively prevent a large ESD from shocking each of the power regulating modules.

Compared with the embodiment described with reference to FIG. 1, the present embodiment provides a protection circuit arranged between the external power supply and each of the power regulating modules, which may prevent the power regulating module from being abnormally damaged by the external power supply; moreover, the present embodiment provides a specific structure of the protection circuit.

Figure 3:
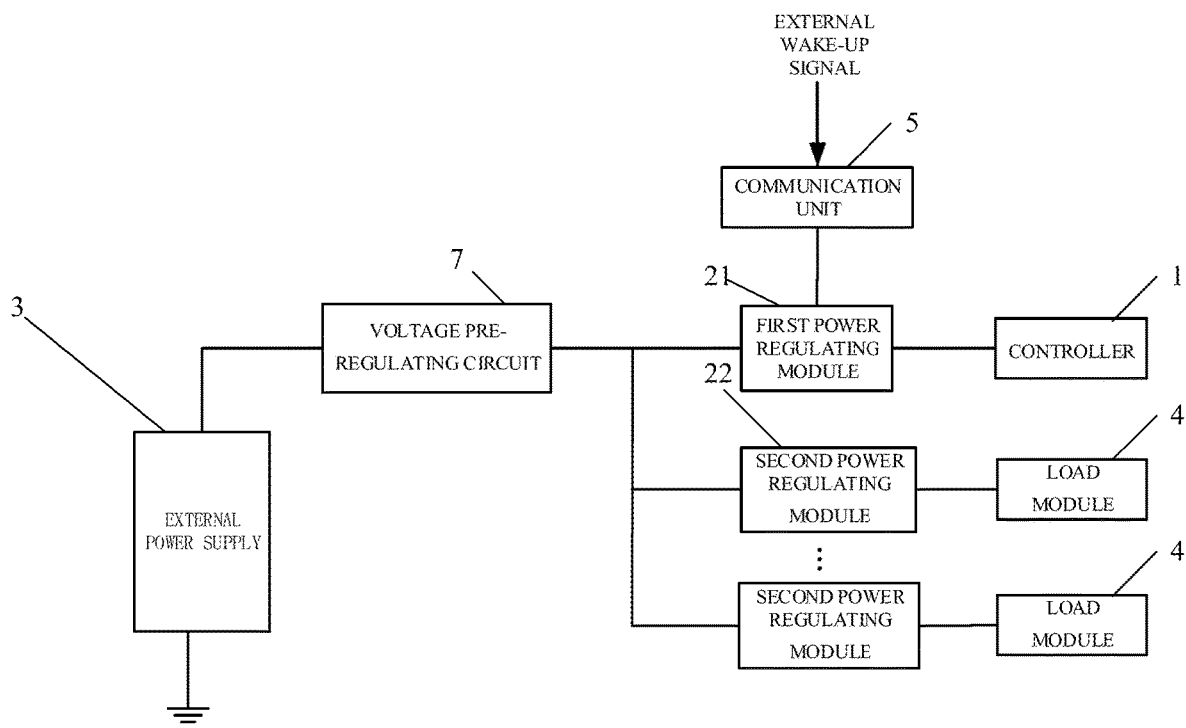
FIG. 3 is a schematic diagram of a control system according to another embodiment of the present disclosure.

The present disclosure further provides a control system, which relates to an improvement made based on the embodiment described with reference to FIG. 1, and the main improvement is that, the control system further comprises a voltage pre-regulating circuit 7 connected between an input end of each of the power regulating modules and the external power supply 3, referring to FIG. 3.

The voltage pre-regulating circuit 7 is configured to pre-regulate the external voltage, and output the pre-regulated external voltage to an input end of each of the power regulating modules. Specifically, the voltage pre-regulating circuit 7 reduces the external voltage to a preset range in advance, and the voltage within the preset range is output to each of the power regulating modules, so that the power regulating module outputs a regulated voltage. When the voltage difference between the external voltage and the regulated voltage is too big, each of the power regulating modules may transform the external voltage to a desired regulated voltage very quickly by pre-regulation of the voltage pre-regulating circuit 7.

It should be noted that, the present embodiment may also provide an improvement made based on the embodiment described with reference to FIG. 2, that is, a pre-regulating circuit 7 is provided between the protection circuit 6 and each of the power regulating modules, and the same technical effect may also be achieved.

Compared with the embodiment described with reference to FIG. 1, in the present embodiment, the external voltage received from the external power supply is pre-regulated by the voltage pre-regulating circuit, so that each of the power regulating modules may regulate the external voltage to a desired regulated voltage more quickly and output the regulated voltage to the controller or the load module.

The fourth embodiment of the present disclosure relates to a control system. The fourth embodiment relates to an improvement made based on the first embodiment, and the main improvement is that, the regulated voltage output by each of the power regulating modules is monitored.

In the present embodiment, there are several ways by which the regulated voltage output by each of the power regulating modules is monitored.

Figure 4:
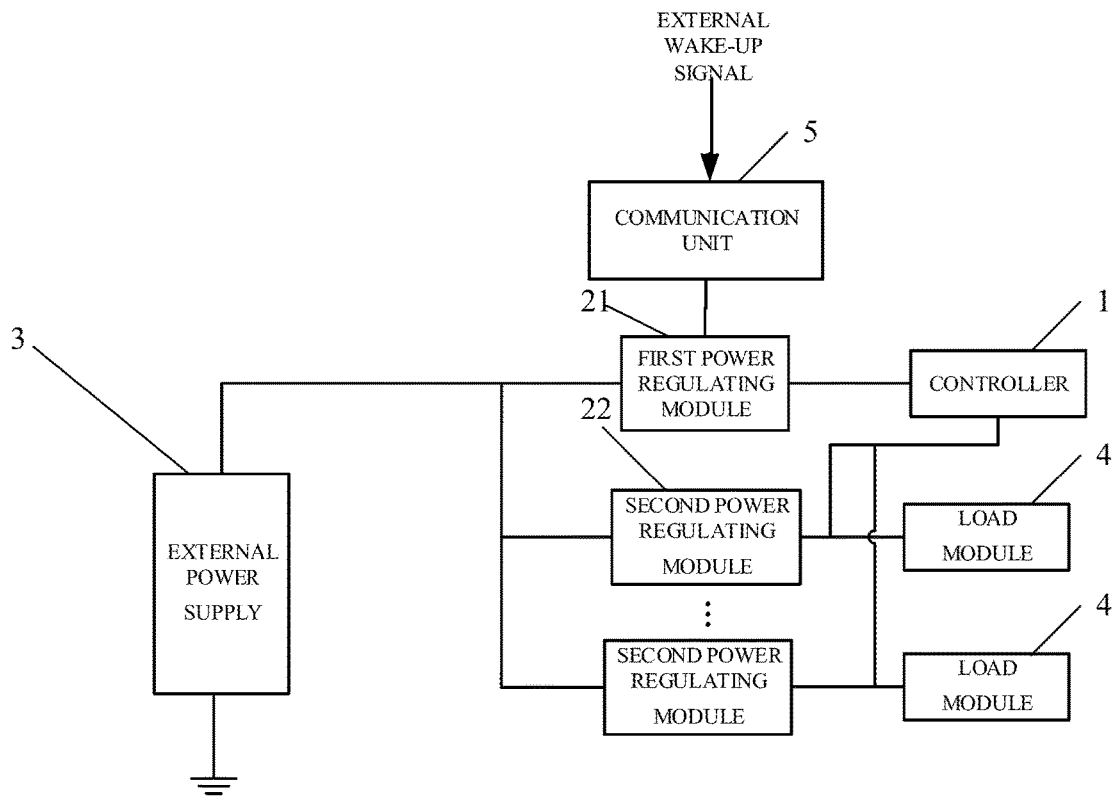
FIG. 4 and FIG. 5 are schematic diagrams of a control system according to another embodiment of the present disclosure.

For example, referring to FIG. 4, the controller 1 is also connected to the output end of each of the second power regulating modules 22 and is configured to monitor the regulated voltage output by the first power regulating module 21 and each of the second power regulating modules 22, and when it is monitored that the regulated voltage is abnormal, a preset measure is taken, such as cutting off the power regulating module that outputs an abnormal regulated voltage, sending out alarm signal, etc.

Figure 5:
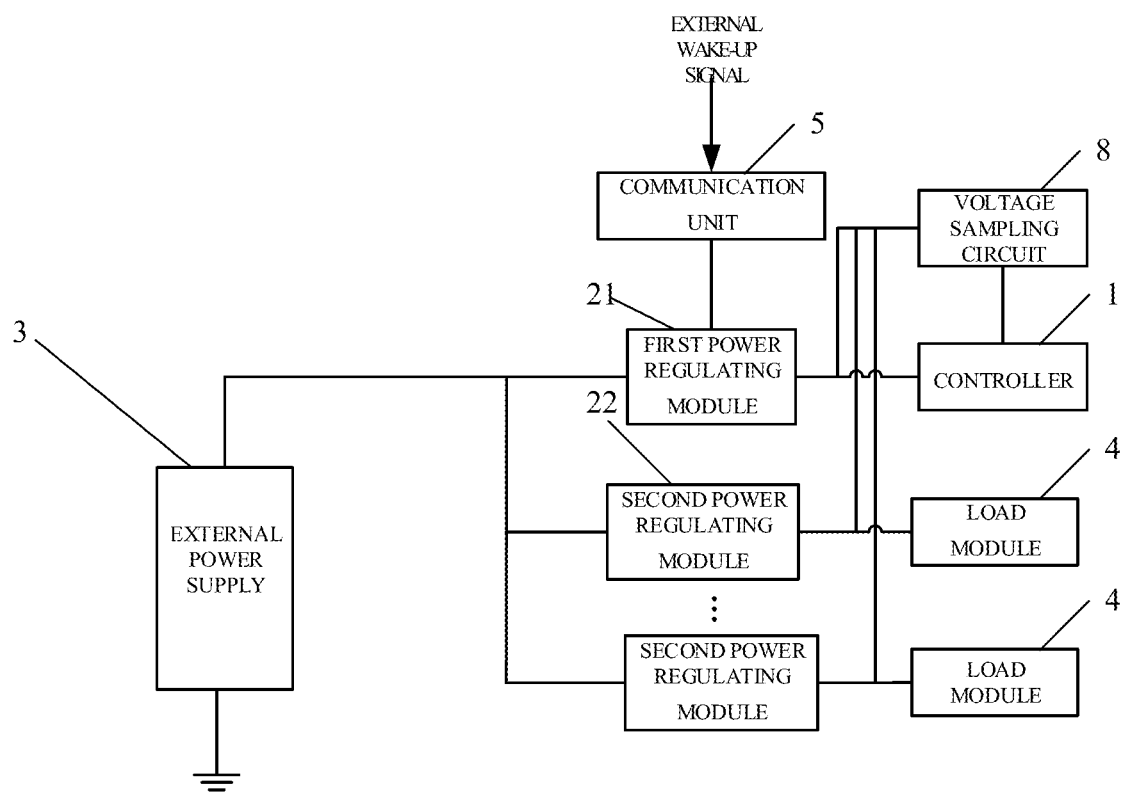

For example, referring to FIG. 5, the controller 1 is connected to the output end of each of the power regulating modules through a voltage sampling circuit 8, such that the regulated voltage output by each of the power regulating modules is monitored by the voltage sampling circuit 8, and when it is monitored that the regulated voltage is abnormal, a preset measure is take, such as cutting off the power regulating module that outputs an abnormal regulated voltage, sending out alarm signal, etc.

For example, referring to FIG. 1, each of the power regulating modules is further configured to monitor an output current at an output end of its own, and upon monitoring that the output current is abnormal (which indicates that the output regulated voltage is abnormal), an emergency measure is taken, such as sending out alarm signal, stopping outputting the regulated voltage, etc.

Compared with the embodiment described with reference to FIG. 1, in the present embodiment, the regulated voltage output from each of the power regulating modules is monitored and a preset measure is taken when the regulated voltage is abnormal, so as to prevent components connected to the power regulating module from being damaged, thus avoiding an accident. It should be noted that the present embodiment may also provide an improvement made based on the embodiments described with reference to FIG. 2, and the same technical effects may also be achieved.

Figure 6:
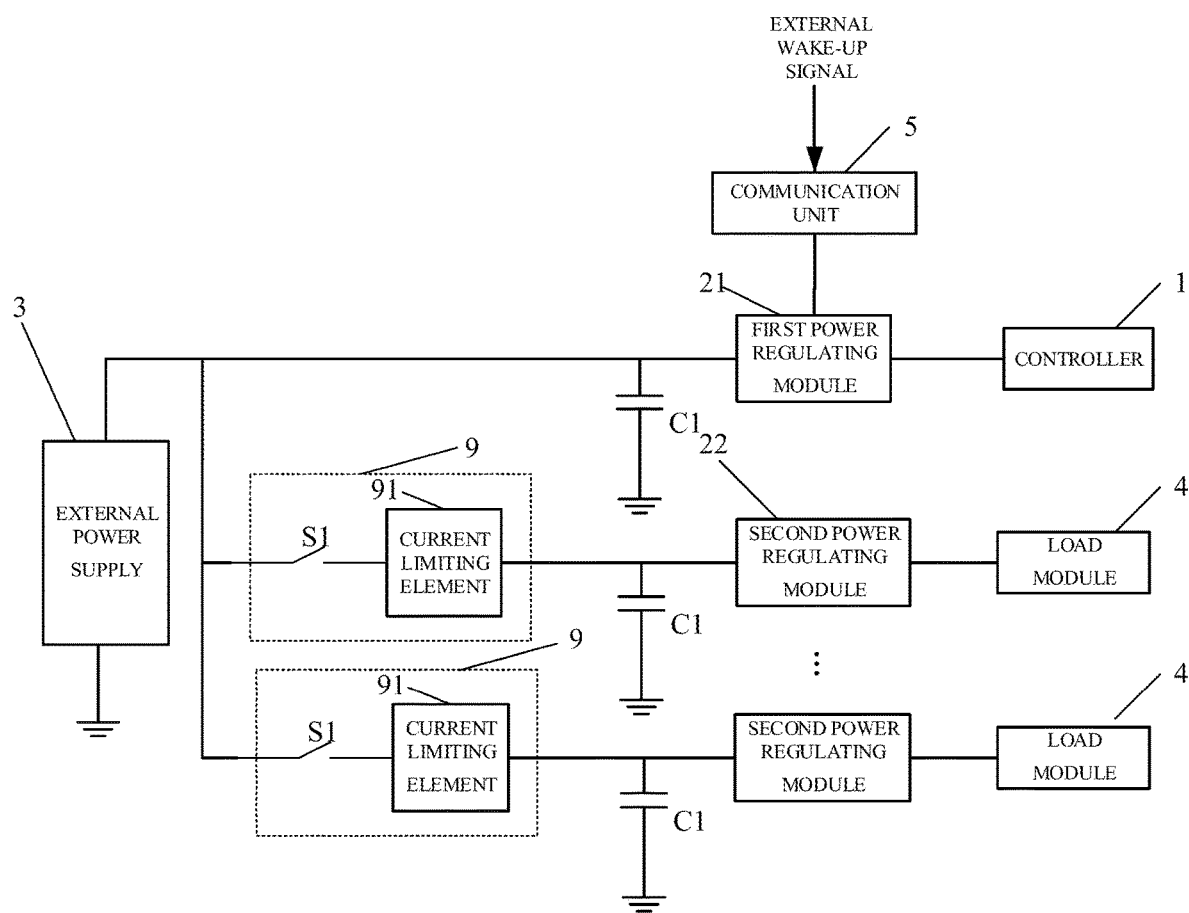
FIG. 6 and FIG. 7 are schematic diagrams of a control system according to another embodiment of the present disclosure.

The present disclosure further provides a control system, which relates to an improvement made based on the embodiment described with reference to FIG. 1, and the main improvement is that, referring to FIG. 6, an input end of the second power regulating module 22 is connected to the external power supply 3 through a switching circuit 9, the switching circuit comprises at least a first switch S1, and the controller 1 is connected to a control end of the first switch S1 (not shown).

After being powered on, the controller 1 controls the first switch S1 to be switched on and wakes up the second power regulating module 22.

In one example, the switching circuit 9 further comprises a current limiting element 91 connected in series with the first switch S1. The current limiting element 91 may be a resistor, a diode, etc., and each of the power regulating modules is provided with a back-end capacitor, i.e., a capacitor C1. When the first switch S1 is switched on, the capacitor C1 is shorted instantly when being powered on and an inrush current will be generated. In the present embodiment, current in the circuit is limited within a safe range by voltage division of the current limiting element 91, thereby avoiding an inrush current being generated instantly when the first switch S1 is switched on.

Figure 7:
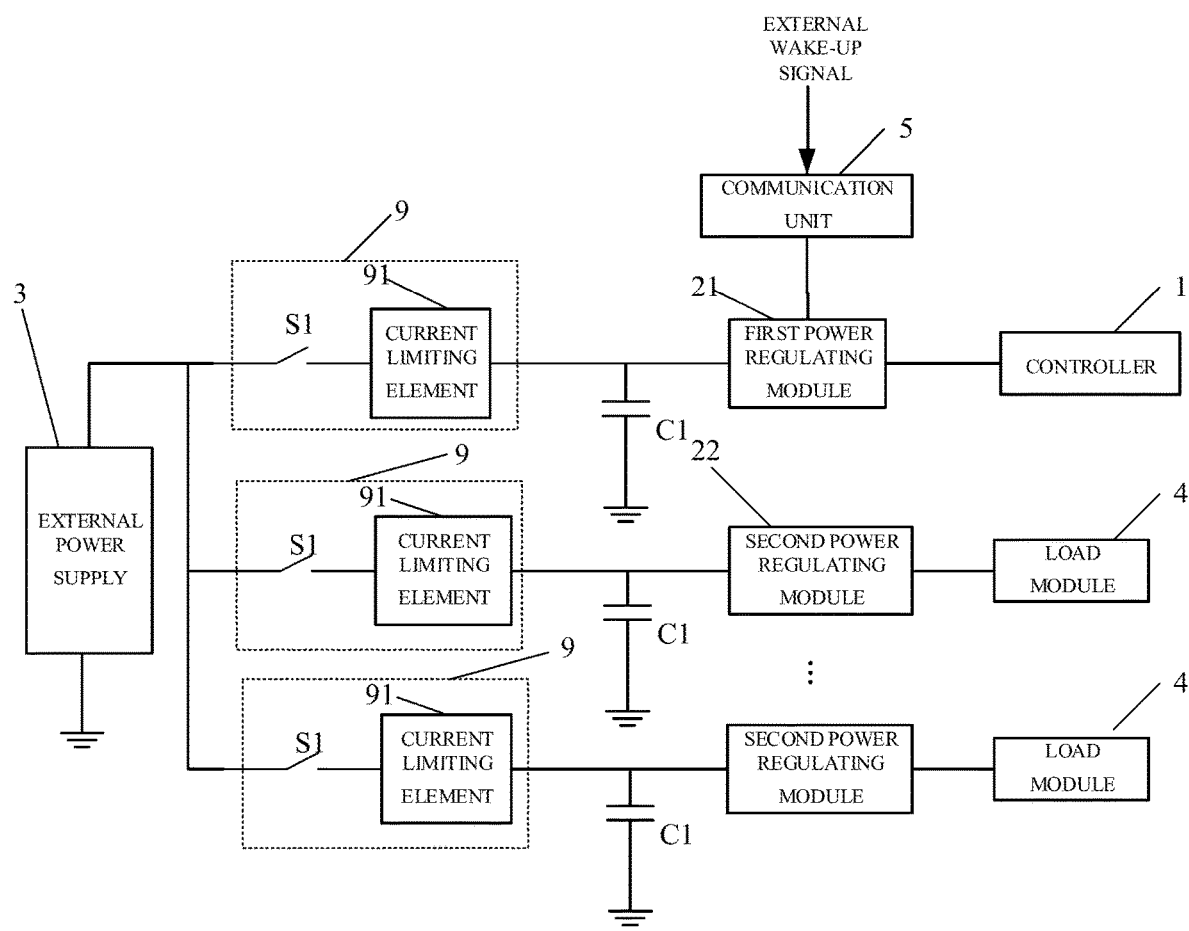

In the present embodiment, referring to FIG. 7, the first power regulating module 21 may also be connected to the external power supply 3 through the switch circuit 9. An example is taken in which the switch circuit 9 comprises the first switch S1 and the current limiting element 91 connected in series. In this case, the first switch S1 connected to the first power regulating module 21 is controlled by the external control signal to be switched on, the first power regulating module 21 is woken up and outputs a regulated voltage to the controller 1 for supplying power thereto. In FIG. 7, the same example is taken in which the switch circuit 9 comprises the first switch S1 and the current limiting element 91 connected in series, however, the present disclosure is not limited to this example, the switch circuit 9 may comprise the first switch S1.

Compared with the embodiment described with reference to FIG. 1, in the present embodiment, the external power supply is connected to each of the second power regulating modules through a switching circuit, and when each of the second power regulating modules is in a sleep state, the external power supply is not conductive with the second power regulating module, thereby reducing the electrostatic current of the whole control system and the power consumption of the external power supply; and, the first power regulating module is also connected to the external power supply through the switching circuit, and when the first power regulating module is in a sleep state, the external power supply is not conductive with the first power regulating module, thereby further reducing the electrostatic current of the whole control system and the power consumption of the external power supply. In addition, the switching circuit may further comprise a current limiting component connected in series with the first switch, and, when the first switch is switched on, current in the circuit is limited within a safe range by the current limiting element, thereby avoiding an inrush current being generated instantly when the first switch is switched on. It should be noted that, the present embodiment may also provide an improvement made based on the embodiments described with reference to FIGS. 1-5, and the same technical effects may also be achieved.

The present disclosure relates to a control system, which is an improvement made based on the embodiment described with reference to FIGS. 6 and 7, and the main improvement is that, the first switch S1 and the current limiting element 91 connected in series are used as a pre-charging circuit, and the pre-charging circuit supplies power to each of the power regulating modules normally after the pre-charging is completed. The control system of the embodiment with reference to FIG. 7 is taken as an example.

Figure 8:
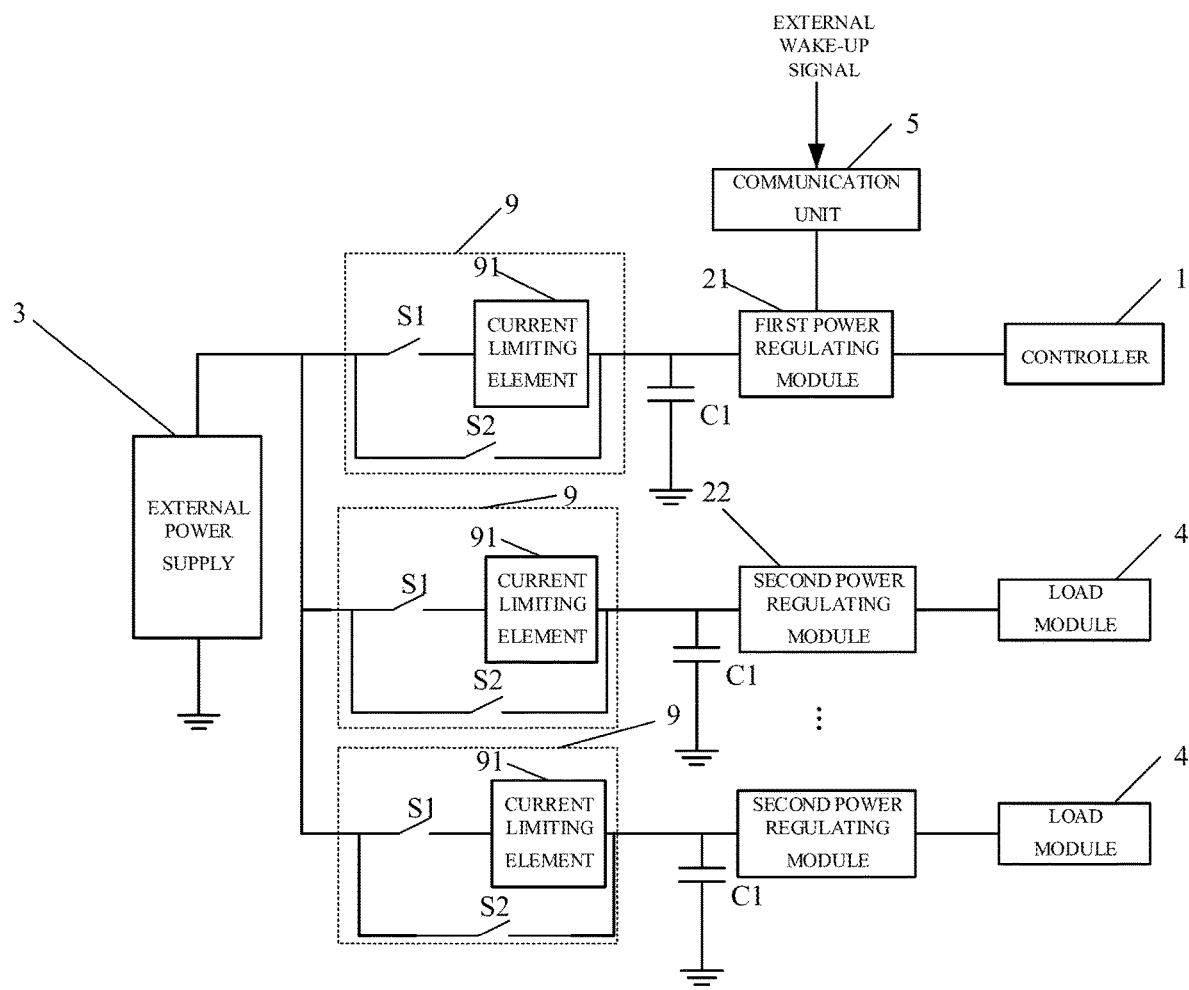
FIG. 8 and FIG. 9 are schematic diagrams of a control system according to another embodiment of the present disclosure.

In an embodiment, referring to FIG. 8, the switch circuit 9 further comprises a second switch S2; the second switch S2 is connected in parallel across the series branch, and a control end of the second switch S2 is connected to the controller; the series branch comprises a first switch S1 and a current limiting element 91 connected in series.

Taking the first power regulating module 21 as an example, the first switch S1 connected to the first power regulating module 21 is controlled to be switched on by an external control signal, and the first switch S1 and the current limiting component 91 connected in series constitute a pre-charging circuit for pre-charging the capacitor C1. After the pre-charging is completed, the first power regulating module 21 is woken up and supplies power to the controller 1. After being powered on, the controller 1 controls the second switch S2 to be switched on, and the series circuit is shorted accordingly, and the external power supply 3 directly outputs an external voltage to the first power regulating module 21. As to the second power regulating module 22, the specific process is similar to that described above, the main difference lies in that after being powered on, the controller 1 controls the first switch S1 connected to the second power regulating module 22 to be switched on.

Figure 9:
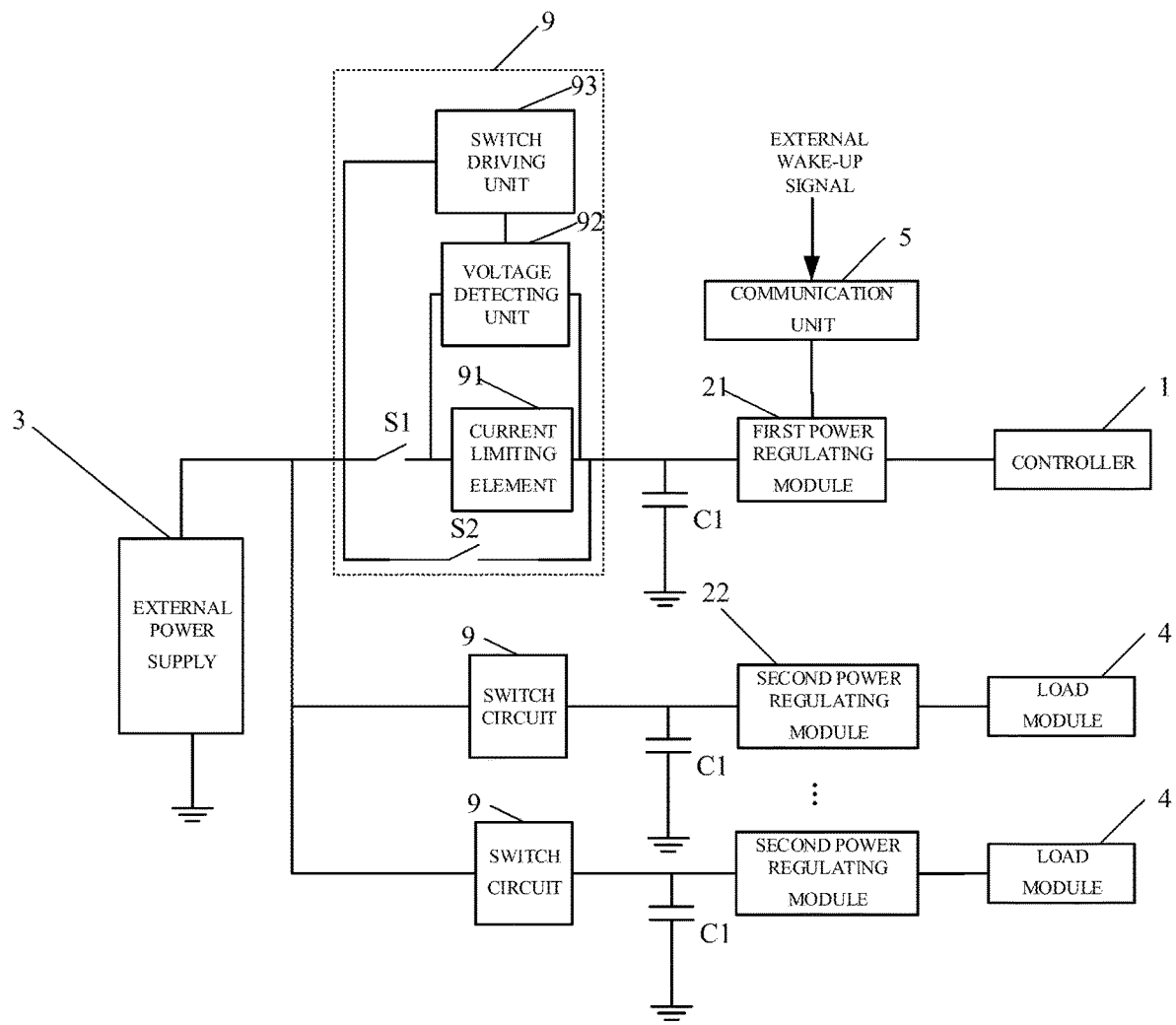

In another embodiment, referring to FIG. 9, the switch circuit 9 comprises a voltage detecting unit 92, a switch driving unit 93, and a second switch S2 connected in parallel across a series branch; wherein the series branch comprises a first switch S1 and a current limiting element 91 connected in series.

The voltage detecting unit 92 is connected in parallel across the current limiting element 91 and is configured to detect a voltage of the current limiting element 91.

An input end of the switch driving unit 93 is connected to the voltage detecting unit 92, and an output end thereof is connected to a control end of the second switch S2; the switch driving unit 93 is configured to receive a voltage of the current limiting element 91, and control the second switch S2 to be switched on upon determining that the voltage of the current limiting element 91 satisfies with a preset condition.

Taking the first power regulating module 21 as an example, the first switch S1 connected to the first power regulating module 21 is controlled to be switched on by an external control signal, and the first switch S1 and the current limiting component 91 connected in series constitute a pre-charging circuit for pre-charging the capacitor C1. The voltage detecting unit 92 detects a voltage of the current limiting element 91 in real time. During the pre-charging process, the voltage of the current limiting element 91 gradually decreases, and the switch driving unit 93 controls the second switch S2 to be switched on when determining that the voltage of the current limiting element 91 received is less than a preset voltage threshold, and the series circuit is shorted at this time, and the external power supply 3 directly output an external voltage to the first power regulating module 21. As to the second power regulating module 22, the specific process is similar to that described above, and the main difference lies in that the controller 1 controls the first switch S1 connected to the second power regulating module 22 to be switched on after being powered on.

In the present embodiment, when the controller 1 or the switch driving unit 93 controls the second switch S2 to be switched on, the first switch S1 may be simultaneously controlled to be switched off, so that a fault in the second switch S2 may be detected in time.

In the present embodiment, both of the first switch S1 and the second switch S2 may be switches with an anti-reverse function, and when there is a fault in any of the power regulating modules, a fault current may be prevented from flowing back to the external power supply or other power regulating modules, thereby avoid affecting normal operation of other power regulating modules.

Compared with the embodiment described with reference to FIG. 1, a series branch composed of the first switch and the current limiting element is used as a pre-charging circuit, and after pre-charging is completed, the controller controls the second switch to be switched on after being powered on, so that the controller is supplied with the regulated voltage, thereby avoiding a voltage division of the current limiting element; at the same time, it may be realized by a hardware circuit, so that the reaction is faster.

A person skilled in the art will appreciate that the above embodiments are specific embodiments for implementing the present disclosure, and in practice, various changes may be made formally and in details without departing from the spirit and scope of the present disclosure.

What is claimed is:

1. A control system, comprising:
a controller; and
a plurality of power regulating modules;
wherein,
each of the plurality of power regulating modules has an input end for connecting to an external power supply to receive an external voltage, and an output end for outputting a regulated voltage generated according to the external voltage; wherein the external power supply is a low voltage battery of an electric vehicle;
the plurality of power regulating modules comprise at least one first power regulating module and at least one second power regulating module, the output end of one of the at least one first power regulating modules is connected to the controller, and the output end of each of the at least one second power regulating module is connected to a respective one of load modules, the input end of the at least one second power regulating module is connected to the external power supply through a switching circuit;
the switching circuit comprises at least a first switch, a control end of the first switch is connected to the controller; and the controller is further connected to a wake-up end of the at least one second power regulating module;
the at least one first power regulating module is configured to be woken up upon receiving an external wake-up signal sent by a communication unit;
the at least one first power regulating module is configured, when being woken up, to supply power to the controller;
the controller is configured, when being powered on, to control the first switch to be switched on and send an internal wake-up signal to the at least one second power regulating module;
the at least one second power regulating module is configured to be woken up upon receiving the internal wake-up signal sent by the powered on controller.

2. The control system according to claim 1, wherein the control system further comprises a protection circuit connected between the input end of each of the plurality of the power regulating modules and the external power supply.

3. The control system according to claim 2, wherein the protection circuit comprises one of the following circuits or any number of the circuits connected in series: a filter circuit, an anti-reverse circuit, a clamp circuit, and an ESD protection circuit.

4. The control system according to claim 1, wherein the control system further comprises a voltage pre-regulating circuit connected between the input end of each of the plurality of the power regulating modules and the external power supply;
   the voltage pre-regulating circuit is configured to pre-regulate the external voltage and output the pre-regulated external voltage to the input end of each of the plurality of the power regulating modules.

5. The control system according to claim 1, wherein the controller is further connected to an output end of each of the plurality of the power regulating modules, and the controller is configured to monitor the regulated voltage and take a preset measure upon monitoring that the regulated voltage is abnormal.

6. The control system according to claim 1, wherein each of the plurality of the power regulating module is further configured to monitor an output current at an output end of the power regulating module, and take an emergency measure upon monitoring that the output current is abnormal.

7. The control system according to claim 1, wherein the input end of the first power regulating module is connected to the external power supply through the switching circuit;
   the first switch connected to the first power regulating module is controlled to be switched on by an external control signal, and the first power regulating module supplies power to the controller upon being woken up.

8. The control system according to claim 1, wherein the switching circuit further comprises a current limiting element connected in series with the first switch.

9. The control system according to claim 8, wherein the switch circuit further comprises a second switch; the second switch is connected in parallel across a series branch, and a control end of the second switch is connected to the controller; wherein the series branch comprises the first switch and the current limiting element connected in series;
   wherein the controller is further configured to control the second switch to be switched on after being powered on.

10. The control system according to claim 9, wherein both of the first switch and the second switch are switches with an anti-reverse function.

11. The control system according to claim 8, wherein the switch circuit further comprises a voltage detecting unit, a switch driving unit, and a second switch connected in parallel across a series branch, wherein the series branch comprises the first switch and the current limiting element connected in series;
   the voltage detecting unit is connected in parallel across the current limiting element and is configured to detect a voltage of the current limiting element;
   an input end of the switch driving unit is connected to the voltage detecting unit, and an output end of the switch driving unit is connected to a control end of the second switch;
   the switch driving unit is configured to receive the voltage of the current limiting element, and controls the second switch to be switched on upon determining that the voltage of the current limiting element satisfies a preset condition.

12. The control system according to claim 1, wherein the control system is a battery management system.

13. The control system according to claim 1, wherein the controller is further configured to output a wake-up hold signal to each of the plurality of the power regulating modules after the power regulating module is woken up.

* * * * *